(12) United States Patent
Moulsley et al.

(10) Patent No.: US 7,164,914 B2
(45) Date of Patent: Jan. 16, 2007

(54) METHOD OF ADJUSTING A TIMING OF TRANSMISSIONS IN A RADIO COMMUNICATION SYSTEM

(75) Inventors: Timothy J. Moulsley, Caterham (GB); Matthew P. J. Baker, Canterbury (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 974 days.

(21) Appl. No.: 09/951,860

(22) Filed: Sep. 13, 2001

(65) Prior Publication Data
US 2002/0049057 A1  Apr. 25, 2002

(30) Foreign Application Priority Data
Sep. 15, 2000 (GB) .................. 0022633.2
Sep. 27, 2000 (GB) .................. 0023617.4

(51) Int. Cl.
H04Q 7/20 (2006.01)
(52) U.S. Cl. ..................... 455/436; 370/331
(58) Field of Classification Search ........ 370/331–333, 370/335; 455/442, 443, 456.1, 436
See application file for complete search history.

(56) References Cited

U.S. PATENT DOCUMENTS 5,268,933 A   12/1993  Averbuch ............... 375/107
6,553,230 B1 *  4/2003  Plestid et al. ........... 455/436
6,873,612 B1 *  3/2005  Steer et al. ............. 370/342
6,982,971 B1 *  1/2006  Tiedemann et al. ...... 370/333
2001/0022779 A1 *  9/2001  Wheatley et al. ........ 370/252

FOREIGN PATENT DOCUMENTS

WO   WO0036762   6/2000

* cited by examiner

Primary Examiner—Duc M. Nguyen
Assistant Examiner—Aung T. Win

(57) ABSTRACT

A secondary station has a receiver capable of resolving signals received as a plurality of multipath signals from a plurality of primary stations during a soft handover process. To decode and act upon the received signals in a very short period of time, the duration of an offset between a downlink timing reference and an uplink timing reference may be varied by the secondary station. By choosing a suitable value for the offset, the secondary station can reduce the changes to the uplink timing reference. The downlink timing reference and/or the offset may be determined from the timings of received downlink signals. The secondary station may request a primary station to adjust the timing of its downlink transmissions to increase the amount of time available for processing the signals by, for example, arranging for downlink signals from the primary station supplying the strongest signal to be received first.

8 Claims, 4 Drawing Sheets

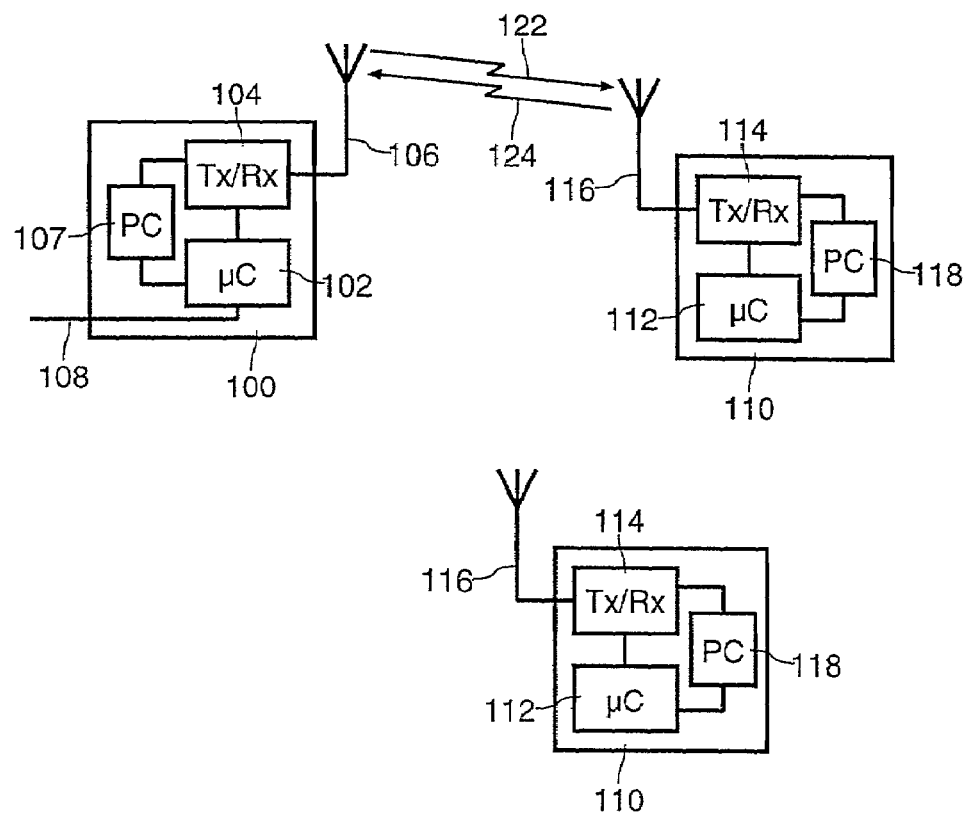
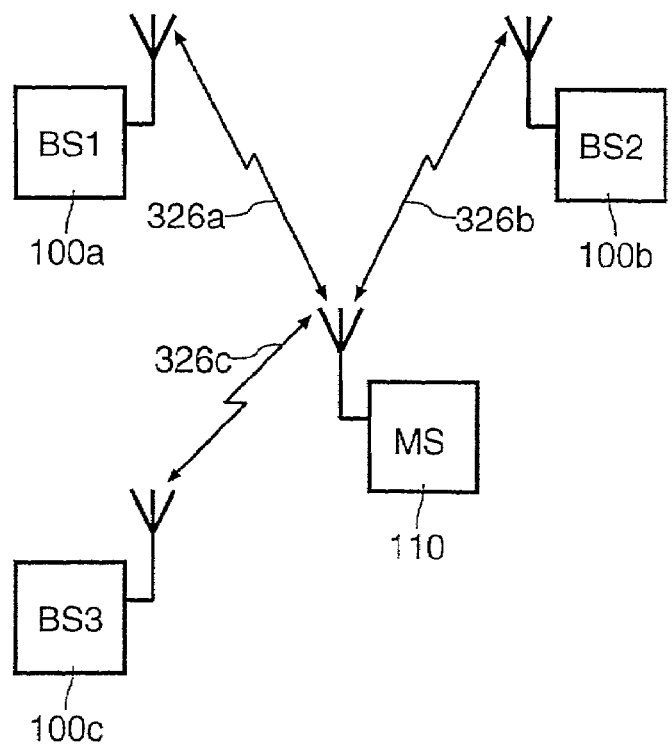
FIG. 1
FIG. 3

METHOD OF ADJUSTING A TIMING OF TRANSMISSIONS IN A RADIO COMMUNICATION SYSTEM

The present invention relates to a secondary station for use in a radio communication system and further relates to a method of operating the secondary station. While the present specification describes a system with particular reference to the emerging Universal Mobile Telecommunication System (UMTS), it is to be understood that the techniques described are equally applicable to use in other mobile radio systems.

There are two basic types of communication required between a Base Station (BS) and a Mobile Station (MS) in a radio communication system. The first is user traffic, for example speech or packet data. The second is control information, required to set and monitor various parameters of the transmission channel to enable the BS and MS to exchange the required user traffic.

In many radio communication systems accurate power control is important. This is particularly so in systems employing spread spectrum Code Division Multiple Access (CDMA) techniques, because many communication channels share the same bandwidth and so transmission at too high a power in any one channel reduces the signal to noise ratio in all the other channels. Uplink power control, of signals transmitted to a Base Station (BS) from a Mobile Station (MS), is particularly important. It ensures that the BS receives signals from different MSs at approximately the same power level for a given data rate and quality of service, while minimising the transmission power required by each MS. Downlink power control, of signals transmitted by the BS to a MS, is required so that the MS receives signals from the BS with a low error rate while minimising transmission power, to reduce interference with other cells and radio systems.

In a UMTS embodiment, power control is normally operated in a closed loop manner. For uplink power control the BS determines the required changes in the power of transmissions from a MS and signals these changes to the MS by means of Transmit Power Control (TPC) commands. To minimise overheads, a TPC command typically instructs the MS to increase or decrease its power, with the change in power being a step of predetermined size. However, in some systems a TPC command may also determine the step size to be used.

A MS generally communicates with a single BS. During the course of a call the MS may wish to investigate transferring to another BS, for example when the quality of the communication link deteriorates as the MS moves away from its BS, or when the relative traffic loading of different cells requires adjusting. The process of transferring from one BS to another is known as handover. In a version of this process known as soft handover, the MS engages in communication with a plurality of BSs (known as the "active set" of BSs) to determine to which BS, if any, it should transfer. When the MS is engaged in this process it will receive TPC commands from each of the BSs. An example of a strategy for determining what change in power to make based on the received TPC commands is disclosed in International Patent Application WO 00/36762.

A problem with power control during soft handover is that there is a limited amount of time available to receive, decode and process the power control commands. For example, in UMTS there is a period of 416 chips (approximately 108 µs) after the arrival of the first TPC command during which the received commands need to be decoded and processed to determine the magnitude and direction of the required power change. This period is followed by a period of 50 µs during which the transmission power change should be made.

This problem is made worse because in UMTS soft handover there may be a time difference of up to 148 chips (38.5 µs) between the arrival times of the first signals from each BS. When the signal from a BS is received via several downlink paths and the information from the paths is combined (for example using a Rake receiver), a further delay is introduced of up to the worst-case delay spread between paths. In a UMTS system this could reduce the available processing time by up to 20 µs. The combined effect of soft handover and delay spread can therefore be to reduce the available processing time by half. This allows very little flexibility for scheduling of the necessary processing tasks in a receiver, particularly for transceiver architectures having significant processing delay through use of vector processors.

An object of the present invention is to improve the behaviour of a MS during soft handover.

According to a first aspect of the present invention there is provided a secondary station for use in a radio communication system comprising a plurality of primary stations, the secondary station having means for engaging in a soft handover process, in which the secondary station communicates simultaneously with at least two primary stations, receiver means for receiving transmitted downlink signals from the at least two primary stations as a plurality of signals, timing measurement means for determining a downlink timing reference, and timing adjustment means for determining an offset between the downlink timing reference and an uplink timing reference for use in the transmission of uplink signals, wherein means are provided for varying the size of the offset.

By varying the size of the offset, the secondary station has more flexibility for selecting a timing reference which enables optimum processing of received signals from a plurality of primary stations in a very short time period.

According to a second aspect of the present invention there is provided a method of operating a secondary station comprising engaging in a soft handover process, in which the secondary station communicates simultaneously with at least two primary stations, receiving transmitted downlink signals from the at least two primary stations as a plurality of signals, determining a downlink timing reference, and determining an offset between the downlink timing reference and an uplink timing reference for use in the transmission of uplink signals, wherein the size of the offset is variable.

The present invention is based upon the recognition, not present in the prior art, that manipulation of the timing of downlink transmissions by a MS can increase the time available for processing of signals.

Embodiments of the present invention will now be described, by way of example, with reference to the accompanying drawings, wherein:

FIG. 1 is a block schematic diagram of a radio communication system in accordance with an embodiment of the present invention;

FIG. 3 is a block schematic diagram of a radio communication system with a MS in the process of soft handover in accordance with an embodiment of the present invention;

In the drawings the same reference numerals have been used to indicate corresponding features.

Figure 2:
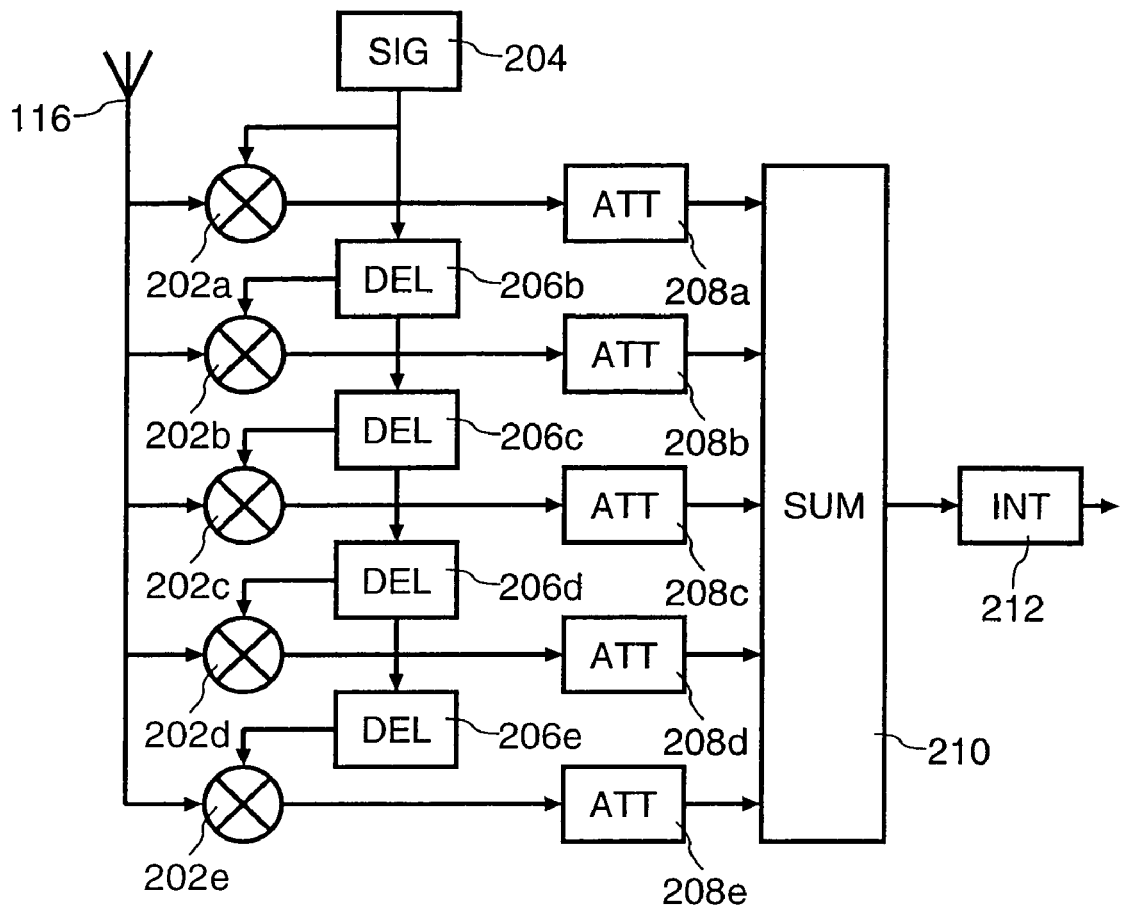
FIG. 2 is a block schematic diagram of a Rake receiver having five fingers.

Referring to FIG. 1, a radio communication system in accordance with an embodiment of the present invention comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (PC) 112, transceiver means (Tx/Rx) 114 connected to antenna means 116, and power control means (PC) 118 for altering the transmitted power level. Communication from BS 100 to MS 110 takes place on a downlink frequency channel 122, while communication from MS 110 to BS 100 takes place on an uplink frequency channel 124.

The transceiver means 114 in a MS 110 may include a Rake receiver. Such a receiver, well known to those skilled in the art, is designed to detect a CDMA signal transmitted over a dispersive multipath channel. A block schematic diagram of a five-finger Rake receiver is shown in FIG. 2. Signals received via the antenna 116 are down-converted to baseband and supplied as a first input to five mixers 202. A signal generator (SIG) 204 generates a local copy of a signal encoded with the same spreading code as that used by the BS 100. This signal is supplied as a second input to the first mixer 202a. The same signal, delayed by delay means (DEL) 206b, is supplied as a second input to the second mixer 202b, and similarly to mixers 202c, 202d, 202e delayed further by delay means 206c, 206d, 206e respectively.

By adjusting the phase of the generated signal according to the output of a channel estimator and the delays applied by the delay means 206, five versions of the same transmitted signal received by five different paths having different delays can be handled. The received signals have their amplitudes multiplied by a weight factor proportional to their respective received signal strengths by attenuators (ATT) 208, and are then summed by adding means (SUM) 210. The combined signal is then integrated by integration means (INT) 212 over successive symbol periods to determine the received symbols, which symbols are supplied to the remainder of the receiver for further processing. If signals are received via more than five different paths, the phase of the signal generator 204 and the delays introduced by the delay means 206 are adjusted to match the five strongest received paths (or those with the best signal to interference ratio).

A MS 110 engaged in a soft handover process is illustrated in FIG. 3 in accordance with an embodiment of the present invention, the MS 110 having three two-way communication channels 326a, 326b, 326c with three respective BSs 100a, 100b, 100c. In a given time slot the MS 110 receives TPC commands from each of BSs 100a, 100b, 100c. If the received signals are processed by a Rake receiver having n fingers, it is conventional for each of the n strongest signals to be allocated to a finger.

Figure 4:
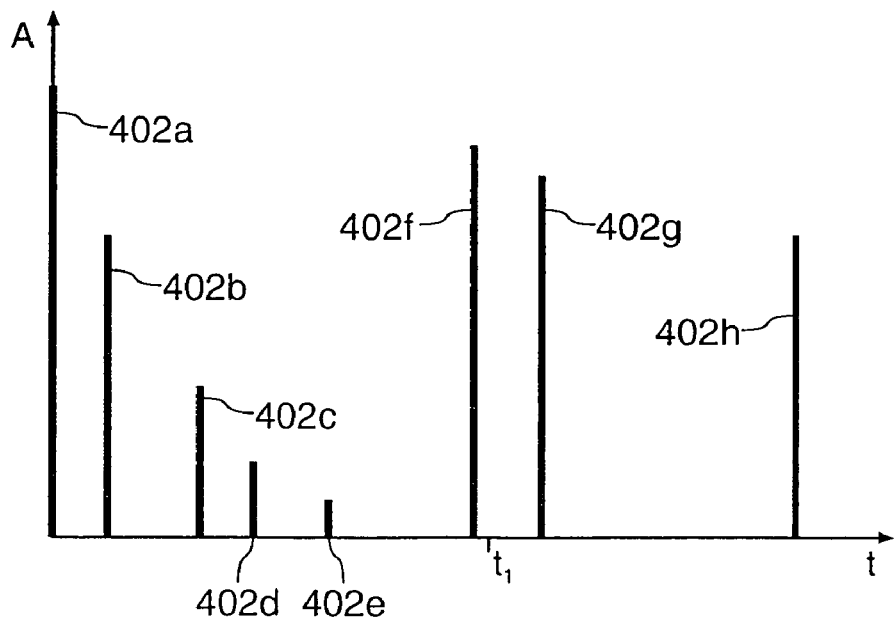
FIG. 4 is a graph showing the amplitude A of received signals against time t from receipt of the first signal in accordance with an embodiment of the present invention.

An example of a set of signals received via different paths in accordance with an embodiment of the present invention is shown in FIG. 4 as a graph of the amplitude A of a plurality of signals 402 against the time of arrival t relative to the time of arrival of the first received signal 402a. If the signals are processed by a six finger Rake receiver, Rake fingers would be allocated to signals 402a, 402b, 402c, 402f, 402g and 402h, while signals 402d and 402e would be ignored.

However, the applicants have determined that such an allocation strategy may not be optimum during soft handover, in view of the limited processing time available. Instead it is proposed, in accordance with the present invention, that Rake fingers are allocated to signals based on time of arrival information, either alone or in combination with signal strength information. This overcomes the situation that a Rake finger is allocated to a signal which has arrived too late to be incorporated in the decision-making process for the next power change, in which case such a finger is effectively wasted.

Hence, in the example shown in FIG. 4, the MS 110 determines that any signals received after time $t_1$ will be too late to be used in determining the next power change. Consequently, the allocation of Rake fingers may be modified from that normally used, as described above, with the fingers being allocated instead to signals 402a, 402b, 402c, 402d, 402e and 402f. This allocation therefore ignores strong late signals (402g, 402h), which arrive after a predefined window of arrival for the first significant path. Such late-arriving signals could optionally be used in determining the power control change to be made in a subsequent slot.

The MS 110 may also employ additional techniques, in addition to or instead of the modified allocation of Rake fingers described above, to increase the time available for processing power control commands. One such technique is for the MS 110 to start making its power change on the basis of an initial estimate of the required power change, made before all information from received signals is available. If necessary, the power change could then be corrected based on further received signals. This technique would yield benefits in flexibility for scheduling of processing tasks in the MS 110, provided that a correction to the implemented power change was only required in a small proportion of cases.

In some soft handover situations, for example when a reliable down command is received from the earliest BS 100, there is no need to wait for further power control commands to arrive. In other cases, a suitable strategy might be always to reduce power when a down command, whether reliable or not, is received from the earliest BS 100, and similarly for increasing power in response to an up command subject to the power change being corrected in the event that a reliable down command is received later. Such a strategy would meet the requirements of the UMTS specification.

On occasions when the direction of the power control step did require correction, such correction would be likely to extend beyond the allocated 50 μs period for making power changes. In itself this is not a problem, provided that the average uplink transmission power for the remainder of the slot after the power change is not affected to such an extent that it falls outside permitted tolerances, and provided that the error vector magnitude does not exceed permitted tolerances. The error vector magnitude is defined in UMTS as the root mean square (rms) error vector between the transmitted waveform and a closely-matched reference waveform.

In systems other than UMTS, particularly where information from different BSs 100 during soft handover might affect the required magnitude of the power step, the strategy of starting the power change based on an initial estimate could have greater benefits. For example, the power change could be implemented by means of an initial coarse power change in the RF part of the transceiver 114 with the remaining fine tuning of the transmission power being achieved by adjusting the amplitude of the baseband signals for transmission once the remaining power control commands had been processed.

Another technique is to modify the timings of transmissions from a BS 100. According to the UMTS specification, the MS 110 notifies a BS 100 if the time of arrival of its signals drifts outside a range of typically ±148 chips relative to signals from other BSs 100 (or alternatively relative to a fixed offset from the timing reference for uplink transmissions). This range is known as the reporting range, and is specified to the MS 110 by the network. The BS 100 can adjust its transmission timing in steps of 256 chips. By reporting a received signal as having arrived outside the acceptable time limit, even if it has not, the MS 110 can arrange the timing of downlink transmissions from a plurality of BSs 100 so as to improve power control command processing. The MS 110 may also decide not to report a weak signal which arrives outside the time limit, for example to avoid any consequent changes to the timing reference.

For example, if the signal from the first-received BS 100 was consistently weaker than the signals from other BSs 100 received later, the MS 110 could report one or more of the stronger, later signals as having arrived late, so that the UMTS network arranged for its timing to be advanced by 256 chips, thereby ensuring that the strongest signal was received first. This algorithm would significantly improve application of the initial estimation method described above.

As an alternative, or in addition, to the above technique, the MS 110 could report as late any downlink signal received more than a predetermined amount late, for example 74 chips (i.e. half of the 148 chip timing tolerance), so as to maximise the time available for power control command processing.

Instead of reporting signals as late when they are not in fact received outside the reporting range, the MS 110 could modify the bounds of the time limit. It will be apparent that these two options are entirely equivalent.

Figure 5:
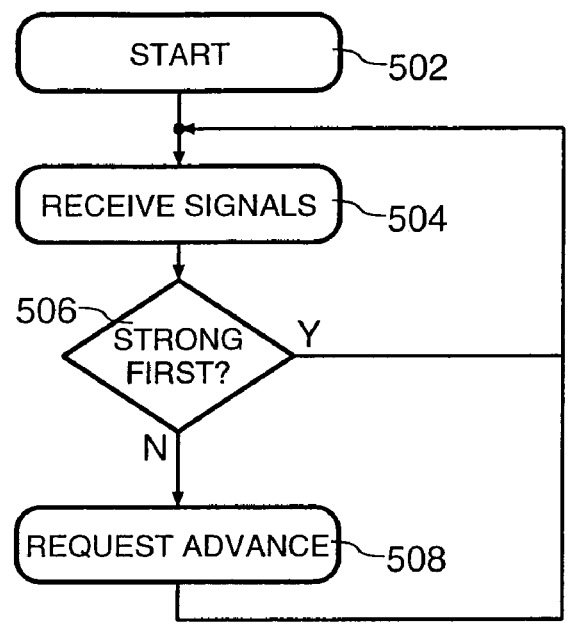
FIG. 5 is a flow chart showing a method of processing multipath signals in accordance with the present invention.

A flow chart illustrating a method in accordance with the present invention of processing multipath signals is shown in FIG. 5. The method starts, at step 502, with a MS 110 beginning a soft handover process and receiving, at step 504, multipath signals from a plurality of BSs 100. The MS 110 then determines, at step 506, whether the signal from the first-received BS 100 is the strongest signal. If it is not the MS 110 requests, at step 508, the BS 100 transmitting the strongest signal to advance its timing by 256 chips, by reporting its signal as having arrived late.

A known problem with the implementation of soft handover relates to the provision of a timing reference for the MS 110 to determine the timing of its uplink transmissions. The reference is typically derived from the timing of received downlink transmissions, since a BS 100 generally has a much more accurate reference clock than the MS 110. In normal operation, the uplink timing reference is typically a predetermined offset $T_0$ from reception of the first significant signal path from a BS 100, with $T_0$ defined to be 1024±1.5 chips in UMTS. Such a reference is straightforward to implement.

However, when a MS 110 is engaged in a soft handover process it is not so obvious how its timing reference should best be derived. Further, the MS 110 is required to report when the downlink timing of any BS 100 in the active set drifts outside a predetermined range. In UMTS this range is known as the "valid range" or "reporting range". As presently defined, the start and end of the reporting range can be at any time between $T_0+256$ and $T_0-256$ chips before the uplink timing reference. In a sample implementation, the reporting range is defined to be $T_0\pm148$ chips before the uplink timing reference, equivalent to ±148 chips from the downlink timing reference. Some methods of deriving the timing reference can lead to the reference being continuously changed.

Figure 6:
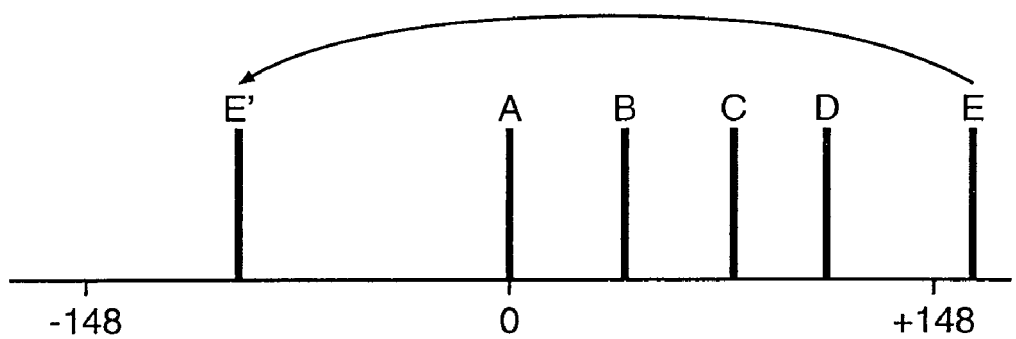
FIG. 6 is a diagram illustrating a soft handover scenario in which the timing reference is continually advanced.

To illustrate this problem, consider a MS 110 which defines its timing reference from the first significant signal received from any BS 100. FIG. 6 shows signals A to E received from five BSs 100, together with the downlink timing reference (0) and the limits of the reporting range at ±148 chips. As illustrated, the timing reference is the time of arrival of signal A, the first signal to arrive. However, signal E has drifted outside the reporting range. The MS 110 reports this to the respective BS 100 which advances its downlink transmission timing by 256 chips, thereby adjusting the timing of its signal to E'. The MS 110 must now adjust its timing reference towards that of signal E', which is now the first received signal. As the timing is adjusted, signal D will drift outside the reporting window, then signal C and so on, as a result of which the MS 110 continually advances its transmission timing.

Figure 7:
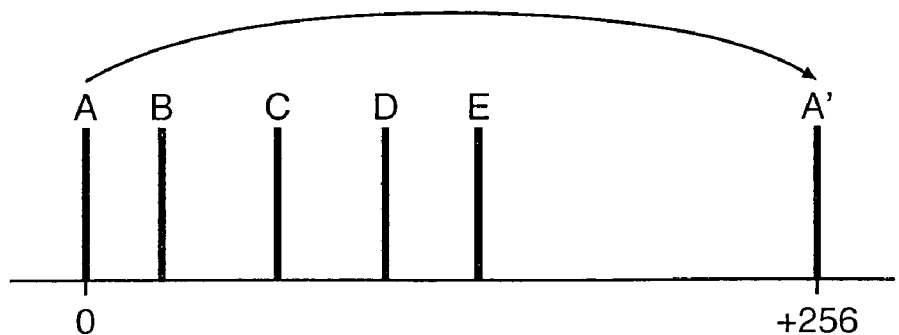
FIG. 7 is a diagram illustrating a soft handover scenario in which the timing reference is continually retarded.

One solution that has been proposed to this problem is to set the uplink timing reference during soft handover to $T_0+128$ chips after the first significant received signal, i.e. an advance of 128 chips. However, this solution does not work if the reporting range is one-sided with respect to the downlink reference timing. FIG. 7 shows such a problem scenario. As the soft handover process begins signals A to E are received, but this time the target uplink timing reference is $T_0+128$ chips after receipt of signal A. The reporting range is between $T_0-256$ and $T_0$ chips before the uplink timing reference, i.e. between 0 and +256 chips relative to the receipt of signal A, as shown in FIG. 7. Hence, as soon as the uplink timing begins to advance to the required $T_0+128$ chips after receipt of signal A, this signal falls outside the reporting range and will have its timing retarded by 256 chips to that of signal A'. Signal B is now the first received signal, and timing of the MS 110 continually advances.

It can therefore be seen that presently-defined solutions for timing references are not suitable for use in soft handover. A suitable test for a good solution is that it minimises the number of BSs 100 which are reported as having their signals outside the reporting range, so as to minimise network traffic. Various possibilities are presented here:

1. Prevent the MS 110 from adjusting it uplink timing reference during soft handover. Since this reference cannot be offset by $T_0$ from the downlink timing reference of all BSs 100, it is not necessary for it to be offset by this amount from any BS 100. Use of the reporting range should be sufficient to maintain a suitable relationship between uplink and downlink timing references.
2. Define a limitation that the reporting range must be symmetric about the downlink timing reference. This enables the uplink timing reference to be offset from it by $T_0+\tau$ chips, where $\tau$ is an additional offset which could be calculated from the actual spread of arrival times of received signals rather than being predetermined. Examples of possible definitions for $\tau$ are:
   (a) half the number of chips between the arrival of the first significant path from the first BS 100 in the active set and the arrival of the first significant path of the last BS 100 in the active set;

(b) half the number of chips between the arrival of the first significant path of the first BS 100 in the active set and the arrival of the last significant path of the last BS 100 in the active set;

(c) the mean number of chips between the arrival of the first significant path of the first BS 100 in the active set and the first significant paths of the all BSs 100 in the active set;

(d) the mean number of chips between the arrival of the first significant path of the first BS 100 in the active set and each of the significant paths of all BSs 100 in the active set;

(e) a weighted average of the number of chips between the arrival of the first significant path of the first BS 100 in the active set and the first significant paths of all BSs 100 in the active set; and (f) a weighted average of the number of chips between the arrival of the first significant path of the first BS 100 in the active set and each of the significant paths of all BSs 100 in the active set.

Such a means of calculating the additional offset has the advantage of relating the uplink transmit timing to the signals actually received. If signals from all the BSs 100 in the active set were received very close together, or very widely dispersed, this approach would help to keep the receive timings centrally within the reporting range, thus achieving the goal of minimising the frequency of reporting BSs 100 for being outside the valid range.

3. Set the transmit timing of the MS 110 so that the first significant paths received from each BS 100 (or all paths from all BSs 100) are received centrally within the reporting range, regardless of whether or not the reporting range is signalled to be symmetric with respect to $T_0$. This can be achieved by calculating the offset $\tau$ as follows:

$$\tau = \frac{B_u + B_l}{2} + \frac{|DL_n - DL_1|}{2} - T_0$$

where $B_u$ is the upper threshold and $B_l$ is the lower threshold of the reporting range, in chips before the uplink timing reference, $DL_n$ is the reception time of the first significant path of the last BS 100 to be received and $DL_1$ is the reception time of the first significant path of the first BS 100 to be received.

Figure 8:
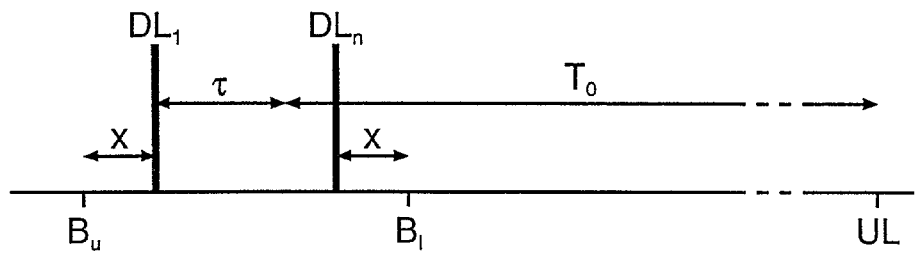
FIGS. 8 to 12 are diagrams illustrating various methods for determining a downlink timing reference in accordance with embodiments of the present invention.

This definition is illustrated in FIG. 8 in accordance with an embodiment of the present invention, where UL represents the uplink transmit reference and the above definition of $\tau$ ensures that the two intervals x are equal. This approach has the advantages of solution 2 above, while retaining the flexibility to enable setting the reporting range asymmetrically about $T_0$ if desired. However, it also has the following drawbacks:

(a) If the reporting threshold is largely positive with respect to $T_0$, i.e. $B_u$ is approximately $T_0$ or more before the uplink timing reference, $\tau$ will be negative. This means that the time available for the MS 110 to decode power control commands is reduced below 1024 chips even for the first signal to be received.

(b) If the reporting threshold is largely negative with respect to $T_0$, i.e. $B_l$ is approximately $T_0$ or more before the uplink timing reference, then $\tau$ can add significant delay to the uplink transmission. This will degrade SIR (Signal to Interference Ratio) estimation at the BSs 100.

One solution to these drawbacks is to set limits on the permissible range of $\tau$, for example $0 \leq \tau \leq |DL_1 - DL_n|$ or $-20 \leq \tau \leq |DL_1 - DL_n| + 20$. However, solution 4 below solves these drawbacks more neatly.

4. Set the uplink transmit timing according to the dimensions of the reporting range. For example:

(a) If the reporting range is entirely negative with respect to $T_0$ (i.e. $B_l$ is $T_0$ or more before the uplink timing reference), the frequency of reporting will be minimised by adjusting the uplink timing to $T_0$ chips after the first significant path of the last BS 100 to be received;

(b) If the reporting range is entirely positive with respect to $T_0$ (i.e. $B_u$ is $T_0$ or more before the uplink timing reference), the frequency of reporting will be minimised by adjusting the uplink timing to $T_0$ chips after the first significant path of the first BS 100 to be received;

(c) If the reporting range is symmetric with respect to $T_0$, the frequency of reporting will be minimised by adjusting the uplink timing to $T_0 + \tau$ chips after the first significant path of the first BS 100 to be received, where $\tau$ can be calculated by one of the methods (a) to (f) in solution 2 above.

In fact, it is possible to cater for any possible combination of upper and lower thresholds of the reporting range (within the permitted range) by calculating $\tau$ as follows:

$$\tau = \frac{B_u - T_0}{B_u - B_l} \times |DL_n - DL_1| \text{ chips}$$

This adjusts the position of the received downlink paths within the reporting range, scaling linearly from one end of the reporting range to the other depending on the symmetry of the reporting range.

Figure 9:
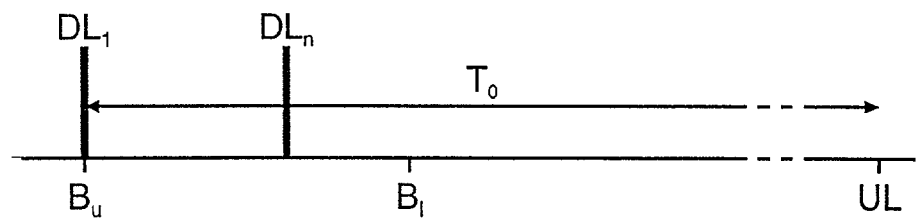
Figure 10:
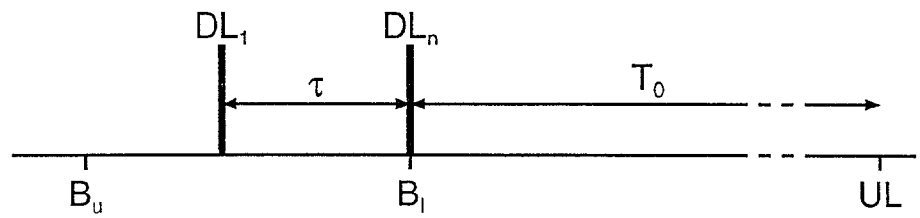

This formula for $\tau$ corresponds to method (a) in solution 2. A similar formula could be envisaged for the other methods (b) to (f), but this is probably the simplest form, and should also minimise the frequency of reporting. For the case of a symmetric reporting range, the result is identical to that of solution 3 presented above. The cases of an entirely positive and an entirely negative reporting range, which worked poorly with solution 3, are shown in FIGS. 9 and 10 respectively in accordance with embodiments of the present invention.

In practice, some additional hysteresis is required, to avoid oscillatory reporting and to allow for downlink timing drift between reporting and downlink timing adjustment.

This could be allowed for in the following way:

$$\tau = \frac{B_u - T_0}{B_u - B_l} \times (|DL_n - DL_1| + 40) - 20 \text{ chips}$$

Figure 11:
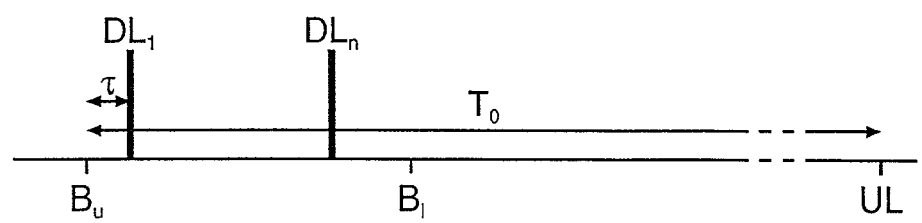
Figure 12:
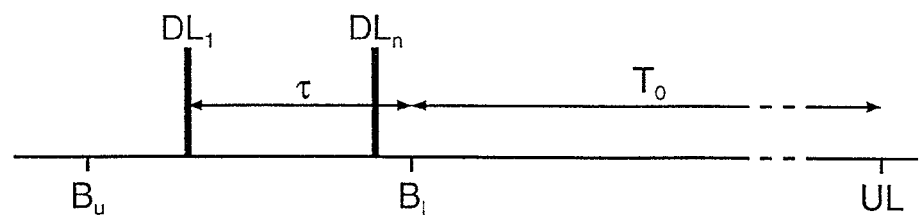

This results in the first significant received downlink paths from each BS 100 (or all the significant received downlink paths) never being closer than 20 chips to the edge of the reporting range, as shown in FIGS. 11 and 12 in accordance with embodiments of the present invention for the two extreme cases of FIGS. 9 and 10. In FIG. 11, $\tau = -20$, while in FIG. 12 $\tau = |DL_1 - DL_n| + 20$.

This method achieves the benefits of solutions 2 and 3 above, retaining flexibility in the dimensioning of the reporting range and avoiding excessive detriment to the time available for decoding power control commands or estimating SIR.

5. Solutions 2, 3 and 4 have the common feature of requiring an additional offset $\tau$ between the first received downlink path and the uplink transmission. It may not be necessary to mandate the precise method for calculating $\tau$, but the MS 110 could be permitted in soft handover to offset the UL transmission from the first significant received path of the first BS 100 by an amount $T_0+\tau$, where for example $-20 \leq \tau \leq |DL_1-DL_n|+20$.

Whichever of the above solutions is adopted, it would be useful to reduce the permissible range for the upper and lower thresholds of the reporting range, to for example ±148 chips. Too large a positive reporting range reduces the time available for the MS 110 to decode power control commands and adjust the uplink transmission power, and too large a negative reporting range degrades the SIR estimation for power command generation at the BSs 100.

Although the above description relates to a Rake receiver, it will be apparent that the present invention is equally applicable to any receiver capable of resolving a plurality of multipath signals. Further, although the above description relates to reception of power control commands via a plurality of multipath signals the present invention is also applicable to other transmissions having tight time constraints for decoding. An example of such a transmission is feedback information for controlling transmit diversity of BSs 100 in a UMTS system.

From reading the present disclosure, other modifications will be apparent to persons skilled in the art. Such modifications may involve other features which are already known in the design, manufacture and use of secondary stations and component parts thereof, and which may be used instead of or in addition to features already described herein. It will be appreciated that certain features of the invention which are, for clarity, described in the context of separate embodiments may also be provided in combination in a single embodiment. Conversely, various features of the invention which are, for brevity, described in the context of a single embodiment may also be provided separately or in any suitable subcombination. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

The invention claimed is:

1. A secondary station for use in a radio communication system comprising a plurality of primary stations, the secondary station having means for engaging in a soft handover process, in which the secondary station communicates simultaneously with at least two primary stations, receiver means for receiving transmitted downlink signals from the at least two primary stations as a plurality of signals, timing measurement means for determining a downlink timing reference, and for determining an offset between the downlink timing reference and an uplink timing reference for use in the transmission of uplink signals, wherein means are provided for varying the size of the offset, wherein the timing measurement means further comprises means for determining whether a first signal path received from a primary station is received within a timing window having a lower and an upper time limit and means for requesting a primary station to alter the timing of transmissions of the primary station so that the first signal path from the primary station is received within the timing window.

2. A secondary station as claimed in claim 1, wherein the timing measurement means further comprises means for determining timings of downlink signals received from at least one of the plurality of primary stations and means for determining downlink timing reference from said timings.

3. A secondary station as claimed in claim 1, wherein the timing measurement means further comprises means for determining timings of downlink signals received from at least one of the plurality of primary stations and means for determining the size of the offset from said timings.

4. A secondary station as claimed in claim 1, wherein means are provided for adjusting at least one of the upper and lower limits of the timing window to enable improved processing of the received signals by the secondary station.

5. A secondary station as claimed in claim 4, wherein the received signals include power control commands and wherein power control means are provided for adjusting the power of uplink transmissions in response to power control commands received from the primary stations.

6. A method of operating a secondary station comprising engaging in a soft handover process, in which the secondary station communicates simultaneously with at least two primary stations, receiving transmitted downlink signals from the at least two primary stations as a plurality of signals, determining a downlink timing reference, determining an offset between the downlink timing reference and an uplink timing reference for use in the transmission of uplink signals, wherein the size of the offset is variable, and determining whether a first signal path received from a primary station is received within a timing window having a lower and an upper time limit, by requesting a primary station to alter the timing of transmissions of the primary station so that the first signal path from the primary station is received within the timing window, and by adjusting at least one of the upper and lower limits of the timing window to enable improved processing of the received signals by the secondary station.

7. A method as claimed in claim 6, further comprising determining timings of downlink signals received from at least one of the plurality of primary stations and by determining the downlink timing reference from said timings.

8. A method as claimed in claim 6, further comprising determining timings of downlink signals received from at least one of the plurality of primary stations and by determining the size of the offset from said timings.

* * * * *